J. HANSEN.
ICE CUTTING MACHINE.
APPLICATION FILED MAR. 20, 1914.

1,179,304.

Patented Apr. 11, 1916.
3 SHEETS—SHEET 1.

Inventor
John Hansen

Witnesses

By Victor J. Evans
Attorney

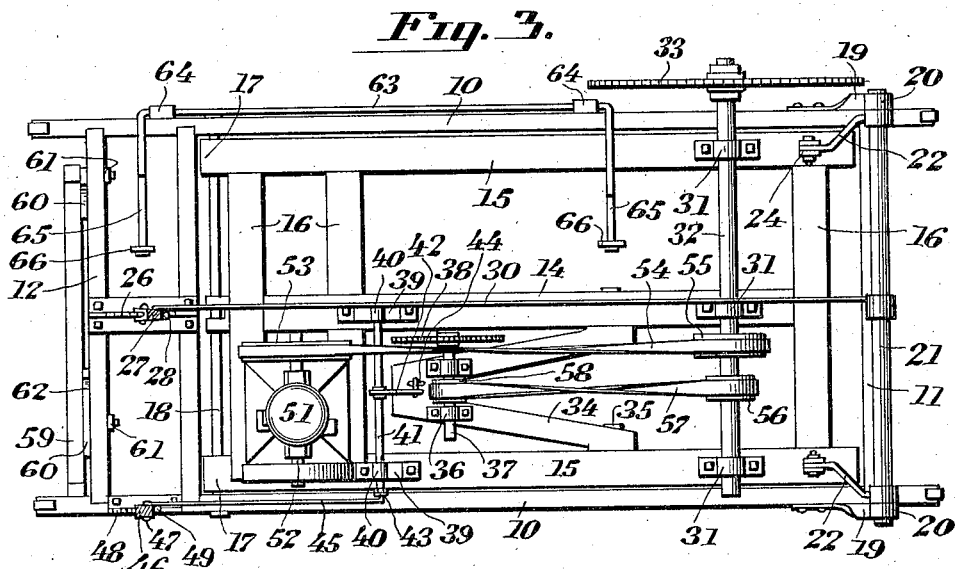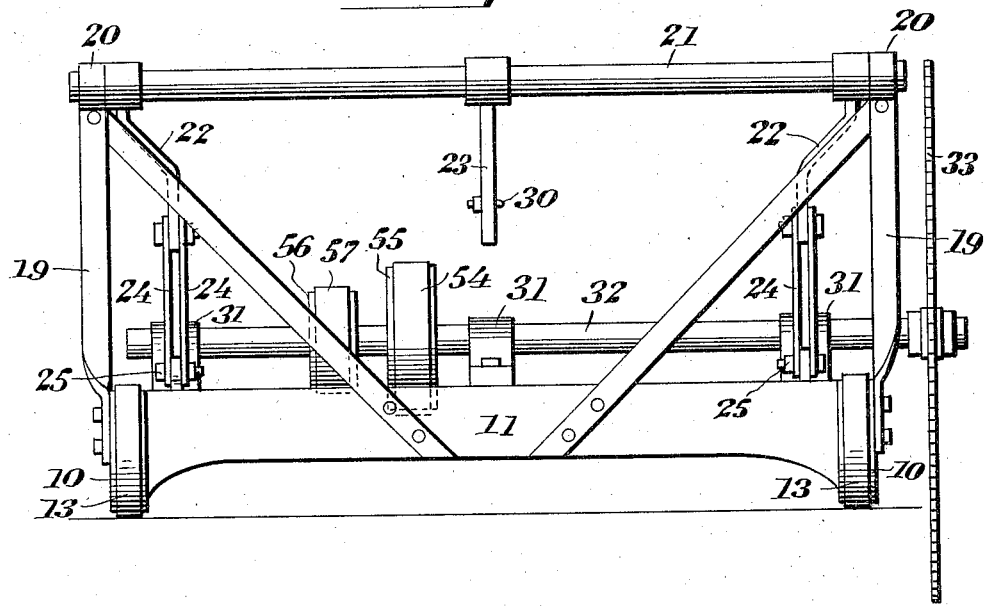

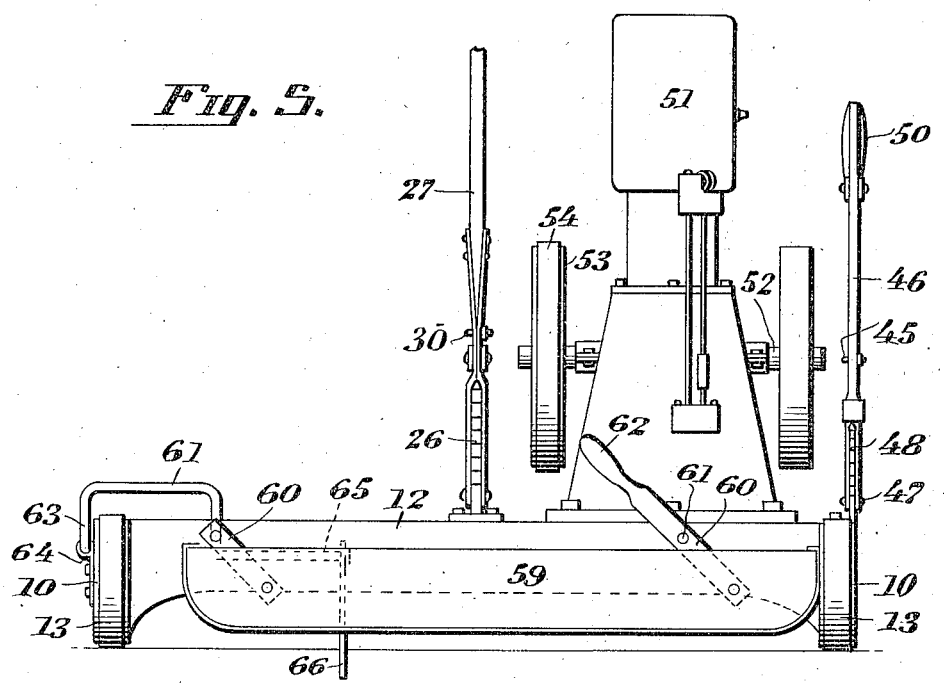
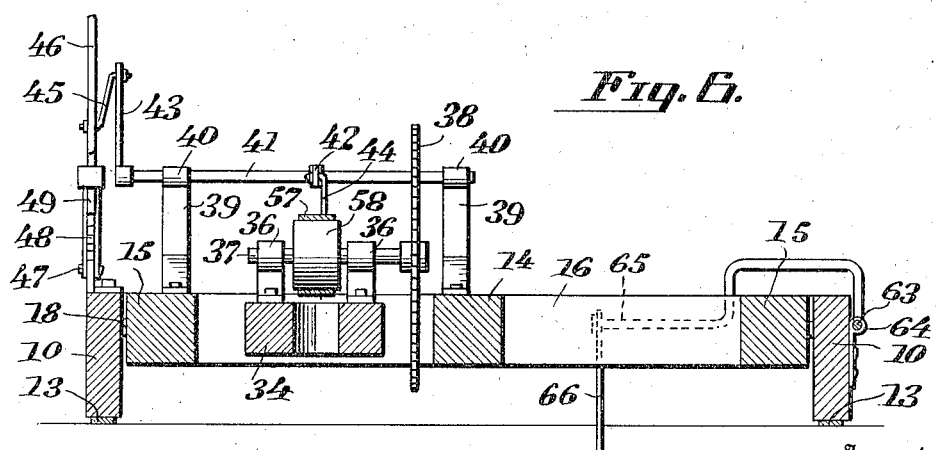

UNITED STATES PATENT OFFICE.

JOHN HANSEN, OF STRONG, KANSAS.

ICE-CUTTING MACHINE.

1,179,304.  Specification of Letters Patent.  Patented Apr. 11, 1916.

Application filed March 20, 1914. Serial No. 826,091.

*To all whom it may concern:*

Be it known that I, JOHN HANSEN, a citizen of the United States, residing at Strong, in the county of Chase and State of Kansas, have invented new and useful Improvements in Ice-Cutting Machines, of which the following is a specification.

The invention relates to ice cutting machines, and has for its primary object to provide a machine of this type wherein the cutting and marking saws are mounted on swinging frames, one being carried by the other and both of which are independently and simultaneously adjustable to permit the varying in the depth of cutting action thereof in the ice as the occasion may require.

Another object of the invention is the provision of an ice cutting machine wherein a guide is arranged thereon to engage in the kerf formed by the marking saw so that the machine will be guided in a straight path and the ice blocks will be cut with uniformity.

A further object of the invention is the provision of a machine of this character wherein the supporting sleigh can be readily and easily turned through the medium of a supplemental runner disposed at right angles to the sleigh runners and carried at one end of the supporting sleigh.

A still further object of the invention is the provision of a machine of this character wherein the heavier side of the same is arranged at a remote point from the line of cut in the ice during the working of the machine, thereby avoiding the possibility of the breaking of the ice while the machine is traveling thereover.

A still further object of the invention is the provision of a machine of this character which is simple in construction, thoroughly reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
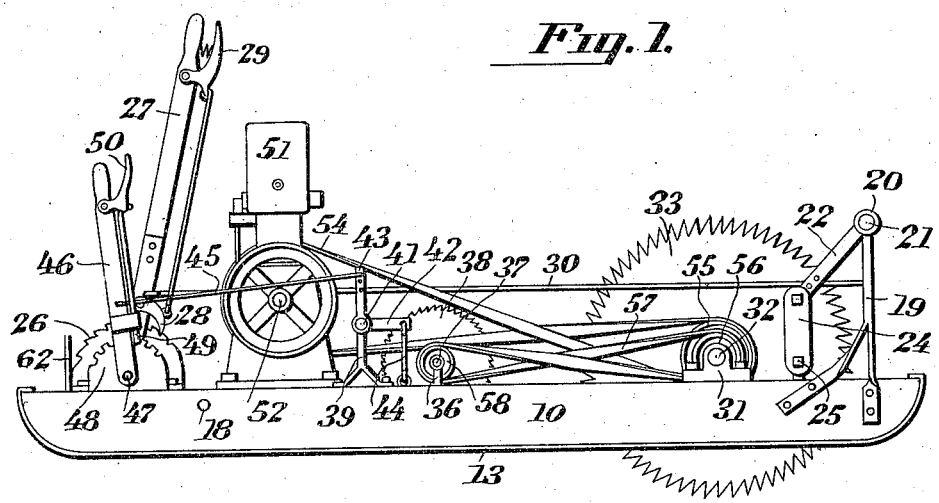
Figure 2:
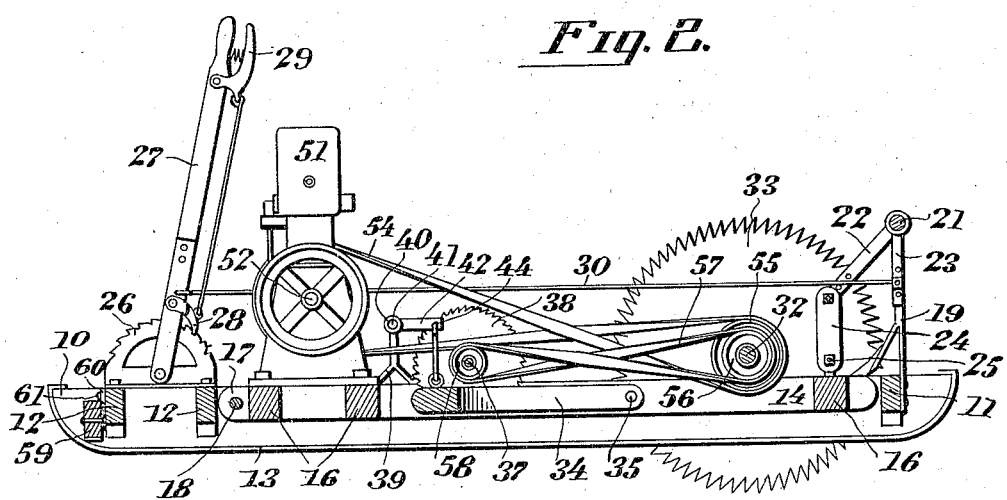

In the drawings:—Figure 1 is a side elevation of a machine constructed in accordance with the invention. Fig. 2 is a vertical longitudinal sectional view thereof. Fig. 3 is a top plan view. Fig. 4 is an end elevation. Fig. 5 is a similar view looking toward the opposite end of the machine. Fig. 6 is a vertical transverse sectional view.

Similar reference characters indicate corresponding parts throughout the several views in the drawings.

Referring to the drawings by numerals, the machine comprises a main frame forming a sleigh including spaced parallel side runners 10 and front and rear cross sills or beams 11 and 12 respectively, the edges of the runners 10 contacting with the ice being provided with steel shoes 13 as usual for the easy guiding of the sleigh over the ice as usual. Swingingly connected in the main frame is a forwardly extending swinging frame including spaced parallel intermediate and outer longitudinal beams 14 and 15 to which are connected front and rear cross bars or beams 16, the outer beams 15 at their rear ends being formed with pintle eyes 17 through which is passed a pivot shaft 18, the same being journaled in the runners 10 for pivotally connecting the said swinging frame to the main frame.

Mounted at the forward ends of the runners 10 of the main frame are vertical uprights 19 terminating at their free ends in bearings 20 in which is journaled a rocking shaft 21 carrying rearwardly extending arms 22 and an intermediate crank arm 23, the arms 22 being pivotally connected to links 24 which are pivotally connected at 25 to the forward end of the swinging frame so that on the rocking of the shaft 21 the said frame will be raised or lowered. Fixed medially to the rear cross beams 12 of the main frame is a vertical toothed segment 26 to which is pivotally connected a throw lever 27 carrying a locking dog or pawl 28 which is pivoted thereto, the same being actuated by means of a hand releasing device 29 of any desirable form, and this pawl or dog 28 is adapted to engage the toothed segment 26 for locking the lever 27 in adjusted position. Also loosely connected with the throw lever 27 is a shift rod 30, the same being adjustably connected to the crank arm 23 so that on moving the lever 27 the shaft 21 will be rocked for the raising or lowering of the swinging frame on the main frame for a purpose presently described.

Mounted in bearings 31 secured to the swinging frame near the forward end thereof is a shaft 32 which has fixed to one end an ice cutting saw 33 of the circular type, the same being disposed slightly beyond one side of the main frame and is adapted to cut the ice over which the machine travels when being moved forwardly or backwardly thereon.

Supported in the swinging frame is a rearwardly extending swinging frame or hanger 34 which has its limbs connected to a pair of the longitudinal beams of the said swinging frame by means of pivots 35, and carried near the free end of this frame or hanger 34 are bearings 36 in which is journaled a stud shaft 37 carrying an ice marking saw 38 of the circular type, the latter being designed to form a kerf in the ice during the cutting action of the saw 33, the said marking kerf being spaced a distance from the line of cut of the saw 33 and extends parallel therewith and in which is adapted to be engaged a guide device presently described.

Fixed to and rising from the swinging frame are uprights 39 formed with bearings 40 in which is journaled a rocking shaft 41 formed with crank arms 42 and 43 respectively, to one of which is loosely connected a link 44, the same being loosely connected to the free end of the hanger 34, while the arm 44 has loosely connected thereto a shift rod 45, the same being loosely connected to a throw lever 46 pivoted at 47 to a vertically disposed toothed segment 48 fixed to the main frame near the rear end thereof. The throw lever 46 carries a locking pin 49 engageable with the toothed segment 48 for locking the said lever 46 in adjusted position, the pin 49 being connected to hand releasing device 50 whereby the lever 46 can be unlocked for the moving thereof to shift the shaft 41 for the raising and lowering of the hanger 34 whereby the marking saw 38 will cut a deep or shallow kerf in the ice during the working of the machine.

It will be noted that the swinging frame pivoted to the main frame 10 and the frame or hanger 34 pivoted to the said swinging frame can be independently raised or lowered, yet on the raising of the swinging frame pivoted to the main frame the said frame or hanger 34 will be raised therewith as will be apparent, thus the said swinging frames can be simultaneously adjusted, that is, by the raising and lowering of the frame pivoted to the main frame.

Mounted upon the swinging frame connected to the main frame at its pivoted end is a driving motor 51 to the driving shaft 52 of which is fixed a belt pulley 53 over which is trained a belt 54, the same being also trained over a pulley 55 fixed to the shaft 21. This shaft 21 also carries a further pulley 56 over which is trained a belt 57, the same being also trained over a pulley 58 fixed to the shaft 37, it being seen that on the working of the motor 51 motion will be imparted to the shafts 32 and 37 for the simultaneous rotation of the same to operate the saws carried thereby. It will be noted that on the raising or lowering of either of the swinging frames the belts 54 and 57 will not be disturbed by either tightening or slackening thereof on the pulleys over which the same are trained.

Mounted at the rear end of the main frame at right angles to the runners 10 thereof is a supplemental runner 59 which is pivotally supported upon the rocking levers 60 pivoted at 61 to the said main frame, one of the levers terminating in a handle 62 whereby the supplemental runner 59 can be moved for the raising and lowering thereof. This supplemental runner 59 when lowered permits the turning of the supporting sleigh in an easy and convenient manner.

Carried on one of the runners 10 is a guide device comprising a rod 63 journaled in bearings 64 fixed to the said runner, the rod 63 being formed with arms 65 which are positioned near the front and rear ends of the main frame and carry stationary rudders or guide plates 66 which are adapted to engage in the kerf cut by the saw 38 when the machine has been shifted from the line of cut executed by the saw 33 so as to guide the machine in a straight course to effect the cutting of the ice in blocks of uniform size. It will be apparent that the marking device can be raised for disengaging the kerf formed by the saw 38 or to bring it out of contact with the ice when it is desired to transport the machine from one point to another. The machine can be driven from the motro 51 in any desirable manner if found desirable.

From the foregoing it is thought that the construction and manner of operation of the device will be clearly understood, and therefore a more extended explanation has been omitted.

What is claimed is:—

In a device of the class described, in combination, a rectangular frame, runners secured to said frame, a rod extending transversely of said frame toward one end, a longitudinal frame trunnioned upon said transverse rod whereby to swing thereupon, a shaft mounted upon said swinging frame at its end opposite to said rod, an ice cutter mounted upon said shaft, bearings secured upon the outer face of said first named frame, a rod journaled in said bearings, U-shaped members formed integrally at the opposite end of said rod, a right angular offset formed upon said U-shaped members, guide bars carried by said offset in perpendicular relation and adapted to project below said runners and to dispose the opposite limbs of said U-shaped members in parallel relation to said runners and to cause said limbs to be disposed at opposite sides of one of said runners, said U-shaped members disposed in the path of swinging movement of said swinging frame, and means on said swinging frame for rotating said ice cutter.

In testimony whereof I affix my signature in presence of two witnesses.

JOHN HANSEN.

Witnesses:
D. P. BOYD,
W. M. GLENNIE.

Copies of this patent may be obtained for five cents each, by addressing the "Commissioner of Patents, Washington, D. C."